United States Patent
Benkreira et al.

(10) Patent No.: US 12,469,057 B2
(45) Date of Patent: Nov. 11, 2025

(54) COMPUTER-BASED SYSTEMS CONFIGURED FOR IDENTIFYING RESTRICTED REVERSALS OF OPERATIONS IN DATA ENTRY AND METHODS OF USE THEREOF

(71) Applicant: Capital One Services, LLC, McLean, VA (US)

(72) Inventors: Abdelkader M'Hamed Benkreira, Brooklyn, NY (US); Michael Mossoba, Great Falls, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 185 days.

(21) Appl. No.: 18/520,233

(22) Filed: Nov. 27, 2023

(65) Prior Publication Data

US 2024/0095787 A1 Mar. 21, 2024

Related U.S. Application Data

(63) Continuation of application No. 17/337,755, filed on Jun. 3, 2021, now Pat. No. 11,830,044.

(51) Int. Cl.
*G06Q 30/0282* (2023.01)
*G06F 18/214* (2023.01)
*G06N 20/00* (2019.01)
*H04L 67/50* (2022.01)

(52) U.S. Cl.
CPC ....... *G06Q 30/0282* (2013.01); *G06F 18/214* (2023.01); *G06N 20/00* (2019.01); *H04L 67/535* (2022.05)

(58) Field of Classification Search
CPC .. G06Q 30/0282; G06N 20/00; H04L 67/535; G06F 18/214
USPC .......................................................... 726/30
See application file for complete search history.

(56) References Cited

U.S. PATENT DOCUMENTS

| | | |
|---|---|---|
| 8,156,026 B2 | 4/2012 | Junger et al. |
| 8,442,844 B1 | 5/2013 | Trandal et al. |
| 9,563,915 B2 | 2/2017 | Brady et al. |
| 11,250,345 B1 * | 2/2022 | Rabbani ................ G06F 16/285 |
| 2016/0321406 A1 * | 11/2016 | Timmerman .......... G06Q 10/10 |
| 2019/0082030 A1 | 3/2019 | Tang et al. |
| 2020/0005312 A1 | 1/2020 | Bull |

(Continued)

*Primary Examiner* — Kaylee J Huang
(74) *Attorney, Agent, or Firm* — Greenberg Traurig, LLP

(57) ABSTRACT

Systems and methods of the present disclosure enable automated identification of restrictions on reversals of data entries by receiving location data from a computing device associated with a user, and utilizing a data profile classification machine learning model to classify a particular data profile according to a data profile classification type based at least in part on a history of data entries associated with the particular data profile when the physical location is within a predetermined proximity of another physical location associated with the particular data profile. A reversal rate of data entries in the history of data entries is determined for the particular data profile. An electronic activity reversal restriction is determined where the reversal rate is below a predetermined value, and a pop-up notification is presented on the computing device notifying the user of the electronic activity reversal restriction of the particular data profile.

13 Claims, 8 Drawing Sheets

(56) References Cited

U.S. PATENT DOCUMENTS

2020/0364728 A1\* 11/2020 Jin ..................... G06Q 30/0205
2021/0056551 A1 2/2021 Xie et al.
2022/0253848 A1\* 8/2022 Tatineni ................. G06Q 40/02

\* cited by examiner

COMPUTER-BASED SYSTEMS CONFIGURED FOR IDENTIFYING RESTRICTED REVERSALS OF OPERATIONS IN DATA ENTRY AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Service, LLC, All Rights Reserved.

FIELD OF TECHNOLOGY

The present disclosure generally relates to computer-based systems for identifying restricted reversals of operations in data entry, including discovery of data operation practices using machine learning modeling, and methods of user thereof.

BACKGROUND OF TECHNOLOGY

Various data operations may have restrictions on available operations and electronic activities that may not be readily apparent to a user. For example, electronic transactions may be restricted from reversal, software navigation operations may be restricted from backtracking or from accessing certain portions of the software or system, among other scenarios.

SUMMARY OF DESCRIBED SUBJECT MATTER

In some embodiments, the present disclosure provides an exemplary technically improved computer-based method that includes at least the following steps of receiving, by at least one processor, location data from a computing device associated with a user, where the physical location data represents a physical location of the computing device; utilizing, by the at least one processor, a data profile classification machine learning model to classify a particular data profile according to a data profile classification type based at least in part on a history of data entries associated with the particular data profile when the physical location is within a predetermined proximity of another physical location associated with the particular data profile, where the data profile classification machine learning model includes a plurality of classification parameters trained to identify similar entities based at least in part on data profile-related data entries, where the data profile-related data entries represent data profile-related electronic activities and data profile-related electronic activity reversals; determining, by the at least one processor, a reversal rate of data entries in the history of data entries for the particular data profile; determining, by the at least one processor, an electronic activity reversal ranking of the data entries in the history of data entries for the particular data profile based at least in part on the reversal rate and the data profile classification type; determining, by the at least one processor, an electronic activity reversal restriction where the electronic activity reversal ranking is below a predetermined value; and generating, by the at least one processor, a computer instruction to the computing device to cause a pop-up notification including the electronic activity reversal restriction of the particular data profile to be presented to the user.

In some embodiments, the present disclosure provides an exemplary technically improved computer-based method that includes at least the following steps of receiving, by at least one processor, web browsing data from a computing device associated with a user, where the web browsing data represents a website visited by the computing device; utilizing, by the at least one processor, a data profile classification machine learning model to classify the particular data profile according to a data profile classification type based at least in part on a history of data entries associated with the particular data profile when the web browsing data represents the website matching a data profile website associated with a particular data profile, where the data profile classification machine learning model includes a plurality of classification parameters trained to identify similar entities based at least in part on data profile-related data entries, where the data profile-related data entries represent data profile-related electronic activities and data profile-related electronic activity reversals; determining, by the at least one processor, a reversal rate of data entries in the history of data entries for the particular data profile; determining, by the at least one processor, an electronic activity reversal ranking of the data entries in the history of data entries for the particular data profile based at least in part on the reversal rate and the data profile classification type; determining, by the at least one processor, an electronic activity reversal restriction where the electronic activity reversal ranking is below a predetermined value; and generating, by the at least one processor, a computer instruction to the computing device to cause a pop-up notification including the electronic activity reversal restriction of the particular data profile.

In some embodiments, the present disclosure provides an exemplary technically improved computer-based system that includes at least the following components of at least one processor. In some embodiments, the at least one processor is configured to execute computer instructions that cause the at least one processor to perform steps to: receive location data from a computing device associated with a user, where the physical location data represents a physical location of the computing device; utilize a data profile classification machine learning model to classify a particular data profile according to a data profile classification type based at least in part on a history of data entries associated with the particular data profile when the physical location is within a predetermined proximity of another physical location associated with the particular data profile, where the data profile classification machine learning model includes a plurality of classification parameters trained to identify similar entities based at least in part on data profile-related data entries, where the data profile-related data entries represent data profile-related electronic activities and data profile-related electronic activity reversals; determine a reversal rate of data entries in the history of data entries for the particular data profile; determine an electronic activity reversal ranking of the data entries in the history of data entries for the particular data profile based at least in part on the reversal rate and the data profile classification type; determine an electronic activity reversal restriction where the electronic activity reversal ranking is below a predetermined value; and generate a computer instruction to the computing device to cause a pop-up notification including the electronic activity reversal restriction of the particular data profile to be presented to the user.

In some embodiments, the present disclosure provides exemplary technically improved computer-based systems and/or methods that include accessing, by the at least one processor, the data profile-related data entries of each data profile in a set of entities; extracting, by the at least one processor, electronic activity features from each data profile-related data entry; determining, by the at least one processor, a set of reversal data entries representing reversed electronic activities based at least in part on the electronic activity features from each data profile related data entry; training, by the at least one processor, the classification parameters of the data profile classification machine learning model to correlate the electronic activity features of a subset of the entities in the set of the entities to electronic activity reversal opportunities based at least in part on the set of reversal data entries.

In some embodiments, the present disclosure provides exemplary technically improved computer-based systems and/or methods that include accessing, by the at least one processor, the data profile-related data entries of each data profile in a set of entities; accessing, by the at least one processor, dispute data entries representing disputed data profile-related data entries of the data profile-related data entries; extracting, by the at least one processor, electronic activity features from each data profile-related data entry; determining, by the at least one processor, a set of reversal data entries representing reversed electronic activities based at least in part on the electronic activity features from each data profile related data entry; and training, by the at least one processor, the classification parameters of the data profile classification machine learning model to correlate the electronic activity features and the dispute data entries of a subset of the entities in the set of the entities to electronic activity reversal opportunities based at least in part on the set of reversal data entries.

In some embodiments, the present disclosure provides exemplary technically improved computer-based systems and/or methods that include where the particular data profile includes a merchant and the data profile-related data entries include transaction records.

In some embodiments, the present disclosure provides exemplary technically improved computer-based systems and/or methods that include where data profile-related electronic activities include transactions associated with the transaction records and data profile-related electronic activity reversals include refunds for one or more transactions of the data profile-related electronic activities.

In some embodiments, the present disclosure provides exemplary technically improved computer-based systems and/or methods that include where the data profile classification machine learning model includes a clustering model.

In some embodiments, the present disclosure provides exemplary technically improved computer-based systems and/or methods that include receiving, by the at least one processor, user feedback data representing user feedback indicating the electronic activity reversal restriction; and training, by the at least one processor, the classification parameters of the data profile classification machine learning model based at least in part on the data profile classification type and the user feedback data.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 8 illustrate systems and methods of restrictions in data operations such as the reversal of certain data operations. The following embodiments provide technical solutions and technical improvements that overcome technical problems, drawbacks and/or deficiencies in the technical fields involving the execution of electronic activities and data entry based thereon. As explained in more detail, below, technical solutions and technical improvements herein include aspects of improved machine learning models to analyze electronic activity histories and attributes of the data entries representative thereof to predict hidden restrictions on subsequent electronic activities including reversal operations for data entries. Based on such technical features, further technical benefits become available to users and operators of these systems and methods. Moreover, various practical applications of the disclosed technology are also described, which provide further practical benefits to users and operators that are also new and useful improvements in the art.

Figure 1:
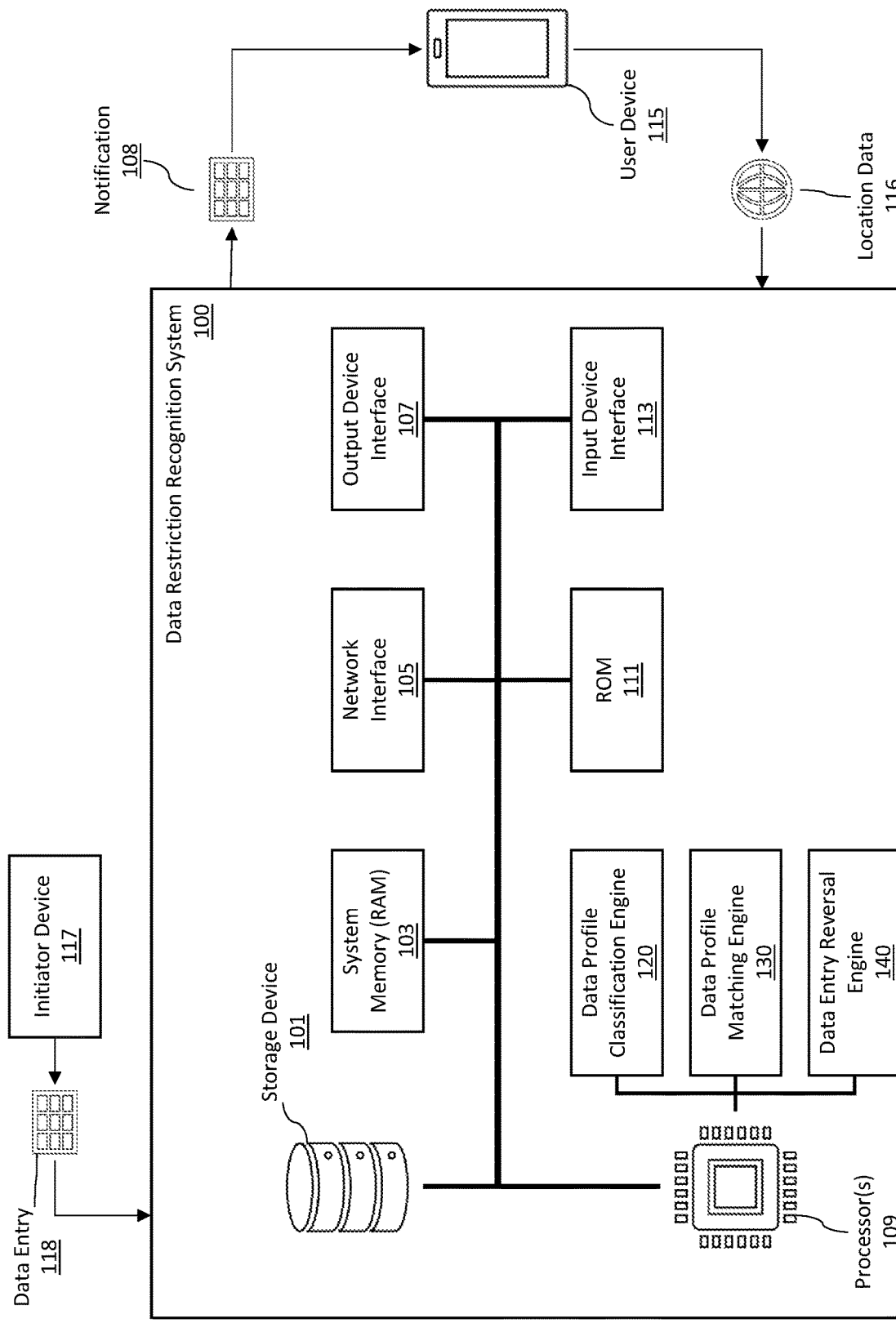
FIGS. 1-8 show one or more schematic flow diagrams, certain computer-based architectures, and/or screenshots of various specialized graphical user interfaces which are illustrative of some exemplary aspects of at least some embodiments of the present disclosure.

FIG. 1 is a block diagram of an exemplary computer-based data restriction recognition system 100 for inferring restrictions on data entry operations in accordance with one or more embodiments of the present disclosure.

In some embodiments, a data restriction recognition system 100 may interact with an initiator device 117 and a user device 115 to identify data profiles that have restrictions on the operations of data entries and preemptively warn a user of the user device 115 of the restrictions. In some embodiments, each data profile may be associated with a history of data entries that are representative of electronic activities. Some entities associated with the data profiles may have policies or practices to introduce restrictions on data operations that may not be apparent to the user in advance. Accordingly, in some embodiments, the data restriction recognition system 100 may automatically recognize the restrictions established for each data profile and notify the user to inform the user's subsequent electronic activities.

In some example embodiments, the data profiles are associated with entities having physical locations, such as, e.g., stores, venues, restaurants, etc. Accordingly, in such example embodiments, the data restriction recognition system 100 may receive data entries 118 from one or more initiator device(s) 117. Each data entry 118 may specify one or more electronic activities initiated by and/or at the initiator device 117.

In some embodiments, the initiator device(s) 117 may include any computing device from electronic activities are performed or executed, such as, e.g., a terminal, personal computer or mobile computing device for performing Internet-based and application-based activities (e.g., account logins, account information changes, online purchases, instant message communications, social media posts, among others and combinations thereof).

In some embodiments, an electronic activity data entry may include attributes such as, e.g., a user identifier associated with each data entry, a third-party entity identifier associated with each data entry, an activity type identifier, an activity value or activity quantity, a time data item, a location data item, a date data item, a device type or device identifier associated with the initiator device(s) 117, an activity description, or other attributes representing characteristics of each data entry.

For example, in some embodiments, the initiator device(s) 117 may include a physical terminal for performing electronic transactions, such as, e.g., a point-of-sale device, automated teller machine (ATM) or other device. As a result of a user executing electronic activities via the initiator device(s) 117, data entries may be produced for entry into the user's account. For example, the electronic activity execution device may produce a data entry 118.

Thus, in some embodiments, the electronic activity data entry may include a transaction-related activity, such as a transaction record (e.g., transaction authorization request, posted transaction, etc.). In such an example, the data items may include a plurality of, e.g., a transaction value, a transaction type, an account identifier or a user identifier or both, a merchant identifier, a transaction authorization date, a transaction post date, a transaction location data, an execution device identifying data (e.g., point-of-sale device, Internet payment, etc.) among other transaction data or any combinations thereof.

In some embodiments, based on the attributes of the data entry 118, the data entry 118 may be correlated to an entity data profile. For example, the third-party entity identifier of each data entry 118 may be matched to one or more entity data profiles. As a result, statistic(s) and/or trend(s) can be determined for each entity based on the entity data profile for each entity and the data entries 118 correlated therewith. In some embodiments, to maintain the entity data profiles and/or record data entries 118 therewith, each data entry 118 may be stored in a storage device 101 of the exemplary data restriction recognition system 100 in an associated data profile of the third-party entity identified by the third-party entity identifier of each data entry 118.

In some embodiments, the storage device 101 of the data restriction recognition system 100 may include, e.g., a suitable memory or storage solution(s) for maintaining electronic data entries 118 representing the electronic activity history(ies) associated with entity. For example, the storage device 101 may include database technology such as, e.g., a centralized and/or distributed database(s), cloud storage platform, decentralized ledger/blockchain system, server or server system, among other storage systems. In some embodiments, the storage device 101 may, additionally or alternatively, include one or more data storage devices such as, e.g., a hard drive, solid-state drive, flash drive, or other suitable storage device. In some embodiments, the storage device 101 may, additionally or alternatively, include one or more temporary storage devices such as, e.g., a random-access memory, cache, buffer, or other suitable memory device, or any other storage device 101 and combinations thereof.

In some embodiments, the data restriction recognition system 100 may use the entity data profile of each entity to determine when each entity is of a type that may have an electronic activity reversal capability. In some embodiments, the electronic activity reversal capability may include any suitable function and/or capability that may reverse, undo, delete, remove, or otherwise negate a data entry 118 and/or electronic activity initiated at the initiator device 117.

For example, in some embodiments, where the initiator device 117 is a point-of-sale device and the data entry 118 is an authorization request for a transaction, the electronic activity reversal capability may include a return and/or rebate of the transaction. In some embodiments, when a computer device and/or system associated with a merchant (e.g., the initiator device(s) 117) may be provided with an electronic activity reversal capability including a return of a transaction may depend on at least one of the type of merchant, the type of transaction, the type of goods and/or services involved in the transaction, legal and/or regulatory rules, or one or more other similarly suitable factors. However, other examples of initiator device(s) 117 with electronic activity reversal capability may include, e.g., electronic message recall or deletion, web browsing activity deletion, and/or other reversable electronic activities or any combination thereof.

Accordingly, in some embodiments, a data profile classification engine 120 may be implemented by one or more processor(s) 109 to classify each entity data profile as being associated with an entity having the electronic activity reversal capability. In some embodiments, the processor(s) 109 may execute software instructions, e.g., in a system memory (RAM) 103, read-only memory (ROM) 111, storage device 101 or any combination thereof that cause the processor(s) 109 to run the data profile classification engine 120.

In some embodiments, the term "engine" (e.g., the data profile classification engine 120) may include at least one software component and/or a combination of at least one software component and at least one hardware component which are designed/programmed/configured to manage/control other software and/or hardware components (such as the libraries, software development kits (SDKs), objects, etc.). The hardware components may include in addition or alternatively to the processor(s) 109, RAM 103, ROM 111 and/or the storage device 101.

In some embodiments, the data profile classification engine 120 may cause the processor(s) 109 to access the entity data profile of each entity in the storage device 101 to analyze the data entries 118 associated with each entity. In some embodiments, the data profile classification engine 120 implements a machine learning model to classify according to a data profile classification type. In some embodiments, the data profile classification type may include, e.g., a reversal capable data profile, not a reversal capable data profile, among other suitable data profile classification types based on the entity data profile of each entity.

In some embodiments, the machine learning model utilized by the data profile classification engine 120 may include any suitable classifier model that is configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neural network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  a. define Neural Network architecture/model,
  b. transfer the input data to the exemplary neural network model,
  c. train the exemplary model incrementally,
  d. determine the accuracy for a specific number of timesteps,
  e. apply the exemplary trained model to process the newly-received input data,
  f. optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the processor(s) 109 may implement the data profile classification engine 120 to utilize the data profile classification machine learning model periodically and/or on demand. For example, the data profile classification machine learning model may automatically update classifications for each entity data profile, e.g., once per day (e.g., overnight), once per week, once every two weeks, once every month, once every six months, or any other suitable period.

In some embodiments, the data profile classification machine learning model may be triggered automatically in response to a new entity data profile being created. In some embodiments, where an initiator device 117 communicates a data entry 118 to the data restriction recognition system 100, the data entry 118 may include a third-party entity identifier that does not match any entity data profile in the storage device 101. Thus, the data restriction recognition system 100 may create a new entity data profile for the third-party entity identifier of the new entity. As a result, the processor(s) 109 may load the data profile classification engine 120 and utilize the data profile classification machine learning model to classify the new entity data profile. In some embodiments, one data entry in an entity data profile may yield a low confidence classification of the entity data profile. Accordingly, the data profile classification engine 120 may be configured to determine that a predetermined number of new data entries 118 are recorded in the new entity data profile before triggering the data profile classification machine learning model, such as, e.g., ten, twenty, twenty five, fifty, one hundred, two hundred, five hundred, one thousand or more or any combination thereof.

In some embodiments, the data profile classification engine 120 may implemented additionally or alternatively based on interactions by the user device 115. In some embodiments, the user device 115 may include software, such as, e.g., an application, applet, daemon, operating system, SDK, or other software or any combination thereof that is configured to report location data 116 to the data restriction recognition system 100. For example, where the data restriction recognition system 100 is associated with a financial services entity (e.g., a bank or other financial services entity), the user may have installed on the user device 115 an application for the financial services entity, where the application is programmed to report the location data 116 to the data restriction recognition system 100.

In some embodiments, the location data 116 may include, e.g., regional, state, city, street address, building name and/or number and/or floor and/or suite identifier, latitude-longitude, location marker identifier, or other type of data identifying a location of the user device 115. In some embodiments, the location data 116 may be produced using sensor data from, e.g., accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA)

based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

In some embodiments, the location data 116 may be received by the processor(s) 109. In some embodiments, a data profile matching engine 130 of the data restriction recognition system 100 may be loaded in response to the location data 116 to identify one or more entity data profiles associated with the location identified by the location data 116. In some embodiments, various entities may have physical locations at which a user may utilize an initiator device such as the initiator device 117 to initiate an electronic activity (e.g., an ATM location, a store location, a parking meter or parking payment machine, etc.). Thus, a user's proximity to the physical locations may be used to alert the user of any data entry restrictions before the user attempts to initiate the electronic activity. For example, where the physical location is a store of an entity including a merchant of physical goods, the location data 116 may be matched to the physical location of store and the user may be notified of store policies such as, e.g., the ability to return purchased goods for cash and/or store credit.

Accordingly, in some embodiments, the data profile matching engine 130 may match the location data 116 to entity data profiles in the storage device 101 that have an attribute associated with the location data 116. In some embodiments, the matching may include comparing the location data to the location attribute of data entries in each entity data profile to identify entity data profiles having data entries within a predetermined proximity to the location data 116. In some embodiments, the predetermined proximity may include, e.g., less that twenty feet, less than fifty feet, less than 100 feet, less than a quarter of a mile, less than a half mile, less than a mile, or any other suitable predetermined proximity to forewarn a user of the policies of the entities.

In some embodiments, using the location data 116 and the location attribute of each data entry, the data profile matching engine 130 may identify one or more entity data profiles in the proximity of the user device 115. In some embodiments, the data profile matching engine 130 may filter the entity data profiles according to the data profile classification type. As described above, the data profile classification engine 120 may classify each entity data profile based on the data entry(ies) recorded therein as being a reversal capable data profile or not being a reversal capable data profile.

In some embodiments, the data profile matching engine 130 may filter the entity data profiles based on pre-generated data profile classification types either before or after matching the location data 116 to one or more entity data profiles. In some embodiments, each entity data profile may be tagged, e.g., using metadata, headers, data record flags, etc., by the data profile classification engine 120 according to the data profile classification type of each entity data profile. As a result, when the data profile matching engine 130 may filter the entity data profiles according to the tags and match the location data 116 to the entity data profiles having the reversal capable data profile. Therefore, the data profile matching engine 130 may use the location data 116 from the user device 115 to identify any entities within the proximity of the user device 115 that may have data entry reversal capability.

In some embodiments, the data restriction recognition system 100 may generate and transmit a notification 108 to the user device 115 based on the identified entities. In some embodiments, the notification 108 may include a list and/or map identifying each identified entity in the user's proximity that may have data entry reversal capability. For example, where a user is located in an area near physical stores, the data restriction recognition system 100 may identity and notify the user via the user device 115 of physical stores that may be able to accept returns of purchases.

In some embodiments, some entities may be capable of data entry reversal to reverse electronic activities but may not or may rarely allow for data entry reversal. Accordingly, in addition to or alternatively to notifying the user of the entities having data entry reversal capability, the data restriction recognition system 100 may automatically determine which of the entities having data entry reversal capability in the proximity of the user device 115 have restrictions on data entry reversal.

Accordingly, in some embodiments, a data entry reversal engine 140 may analyze the data entries associated with each entity data profile tagged as a reversal capable data profile. Thus, in some embodiments, the data entry reversal engine 140 may filter the entity data profiles to select the entity data profiles tagged as reversal capable data profiles. In some embodiments, the data entry reversal engine 140 may access the data entries of each selected entity data profile and identify data entries that have subsequent reversal data entries.

In some embodiments, the data entry reversal engine 140 may, for each selected entity data profile, compare the attributes of each data entry to each other data entry. Where a data entry in a particular selected entity data profile has attributes that match a later (e.g., in time) data entry in the same selected entity data profile and having a reversed quantity, value, amount or other quantification, the later data entry may be identified as a reversal of the earlier data entry.

In some embodiments, the data entry reversal engine 140 may compare the activity value or activity quantity attributes, the location data items, activity description, the user identifier attributes, among other attributes between an earlier data entry and each later data entry. In some embodiments, by comparing an earlier data entry with each later in time data entry, the data entry reversal engine 140 may determine a similarity of each pair of data entries.

In some embodiments, data entries may be matched according to a measure of similarity of individual or combinations of attributes represented in the data entries. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same.

In some embodiments, similarity may be measured between each individual attribute separately, and the respective similarity scores summed, averaged, or otherwise combined to produce a measure of similarity of two data entries. In some embodiments, the similarity may instead or in addition be measured for a combination of the device identifier, device type identifier and location identify. For example, a hash or group key may be generated by combining the device identifier, device type identifier and location identify. The hash may include a hash functioning that takes as input each of attribute or a subset of attributes of a particular data entry. The group key may be produced by creating a single string, list, or value from combining each of, e.g., a string, list or value representing each individual attribute of the particular data entry. The similarity between two data entries may then be measured as the similarity between the associated hashes and/or group keys. The measured similarity may then be compared against the predetermined similarity score to determine candidate data entries that are candidates as matching to each other.

In some embodiments, the data entry reversal engine 140 may implement rules for matching a pair of data entries. In some embodiments, a first rule may include that the activity value or activity quantity attributes of each data entry of the pair of data entries may have opposite values (e.g., one data entry having a positive amount and one data entry having a negative amount, or any other suitable type of opposite values).

In some embodiments, the data entry reversal engine 140 may iteratively search through each data entry of an entity data profile to compare each data entry with each later in time data entry in the entity data profile. Thus, each data entry having an associated reversal data entry can be identified by restricting the comparison to the data entries that occurred later in time.

In some embodiments, the data entry reversal engine 140 may use the pairs of data entry and reversal data entry of each entity data profile to determine a reversal metric for each entity, thus characterizing the likelihood of the entity allowing reversals versus not allowing reversals. In some embodiments, the reversal metric may include any suitable statistical metric of data entry reversals, such as, e.g., reversal rates over predetermined time intervals (e.g., each week, each two weeks, each month, each fiscal or calendar quarter, each fiscal or calendar half, each fiscal or calendar year, among other intervals or any combination thereof), number of reversal data entries per number of total data entries, number of reversal data entries per number of data entries not having an associated reversal data entry, among metrics or any combination thereof.

In some embodiments, the data entry reversal engine 140 may compare the reversal metric to a predetermined threshold value to determine when a particular entity has an electronic activity reversal restriction. In some embodiments, where the reversal metrics is below the predetermined threshold value, the particular entity initiates reversal data entries to reverse electronic activities at a rate low enough to indicate that the particular entity does not allow for electronic activity reversals. For example, where the entity is a merchant, the merchant may rarely allow returns of electronic payments even where the merchant's initiator device(s) 117 is of a type that allows returns on purchases, however other examples may be included (e.g., cloud storage file sharing, network communications, social media communications, etc.).

In some embodiments, the predetermined threshold value may include, e.g., a relative measure. The reversal metric of each entity data profile may be compared to, e.g., rank each entity. The rank may include a ranked list where a higher rate of reversals increases the rank in the list, or may be percentile based, where the distribution of reversal metrics across entities is used to determine the percentile in rate of reversals for each entity. In some embodiments, where a particular entity is ranked in, e.g., a bottom 10 percent, bottom 20 percent, bottom 25 percent, etc., of the ranked list and/or distribution, the particular entity may be identified as having an electronic activity reversal restriction.

In some embodiments, the ranked list and/or distribution may be updated by the data entry reversal engine 140 periodically or on demand, or both. For example, the data entry reversal engine 140 may determine the distribution and/or ranked list of reversal metrics across entity data profiles on a period basis, e.g., every day, every night, every week, every month, every fiscal or calendar quarter, every fiscal or calendar half, every fiscal or calendar year, or any combination thereof.

In some embodiments, the predetermined threshold value may be a statistically determined reversal rate based on each entity, each entity of a particular type, each entity in a particular geographic region, or other grouping of entities that may relate to reversal rate. In some embodiments, the statistically determined reversal rate may include, e.g., an average reversal rate, a median reversal rate, a standard deviation of an average or median reversal rate, a regression of reversal rate, or other statistical measure or any combination thereof. In some embodiments, the statistically determined reversal rate may be determined on a moving time window basis, e.g., continuously or periodically updated with data entries 118 in a most recent window of time, where the window of time may include, e.g., one week, two weeks, three weeks, four weeks, one month, two months, three months, four months, six months, 12 months, two years, three years, or other suitable time window for statistically determining a threshold rate of reversal or any multiple and/or combination thereof.

In some embodiments, separate predetermined threshold values may be determined for separate groupings of entity data profiles. For example, entity data profiles for entities within similar geographic regions may be more likely to have similar rates of reversals. In some embodiments, a similar geographic region may include, e.g., the same state, the same time zone, the same city or town, the same national region (e.g., the Northeast, New England, Mid-West, West Coast, etc.), same zip code, or other geographic regions. For another example, entity data profiles for entities within similar categories of entities may have similar rates of reversals. In some embodiments, a similar category may include, e.g., a merchant category code (MCC) for merchants, an entity size (e.g., according to number of employees, number of physical locations, total a number of data entries, revenue, etc.), or other grouping of entities or any combination thereof.

In some embodiments, where the entities in the proximity of the user device 115 based on the location data 116 include one or more entities having an, electronic activity reversal restriction the data restriction recognition system 100 may update the notification 108 or generate a new notification 108 to indicate the electronic activity reversal restriction for each entity. As a result, the user may be alerted to reversal-capable entities that restrict reversals.

As a result, in some embodiments, the user may be provided with automated alert(s) concern entity restrictions, such as electronic activity reversal restrictions, that would otherwise rely on reading long, complicated policies. In some embodiments, the data profile classification engine 120, the data profile matching engine 130 and the data entry reversal engine 140 are orchestrated to leverage existing behavior data to predict the electronic activity reversal restrictions, obviating the need for more resource intensive processes such as natural language processing and web crawling. Instead, the aspects of the present embodiments enable inferring the existence of electronic activity reversal restrictions with efficient computer engines and models for dynamic and real-time alerts to the user device 115 while in the proximity of entities.

Figure 2:
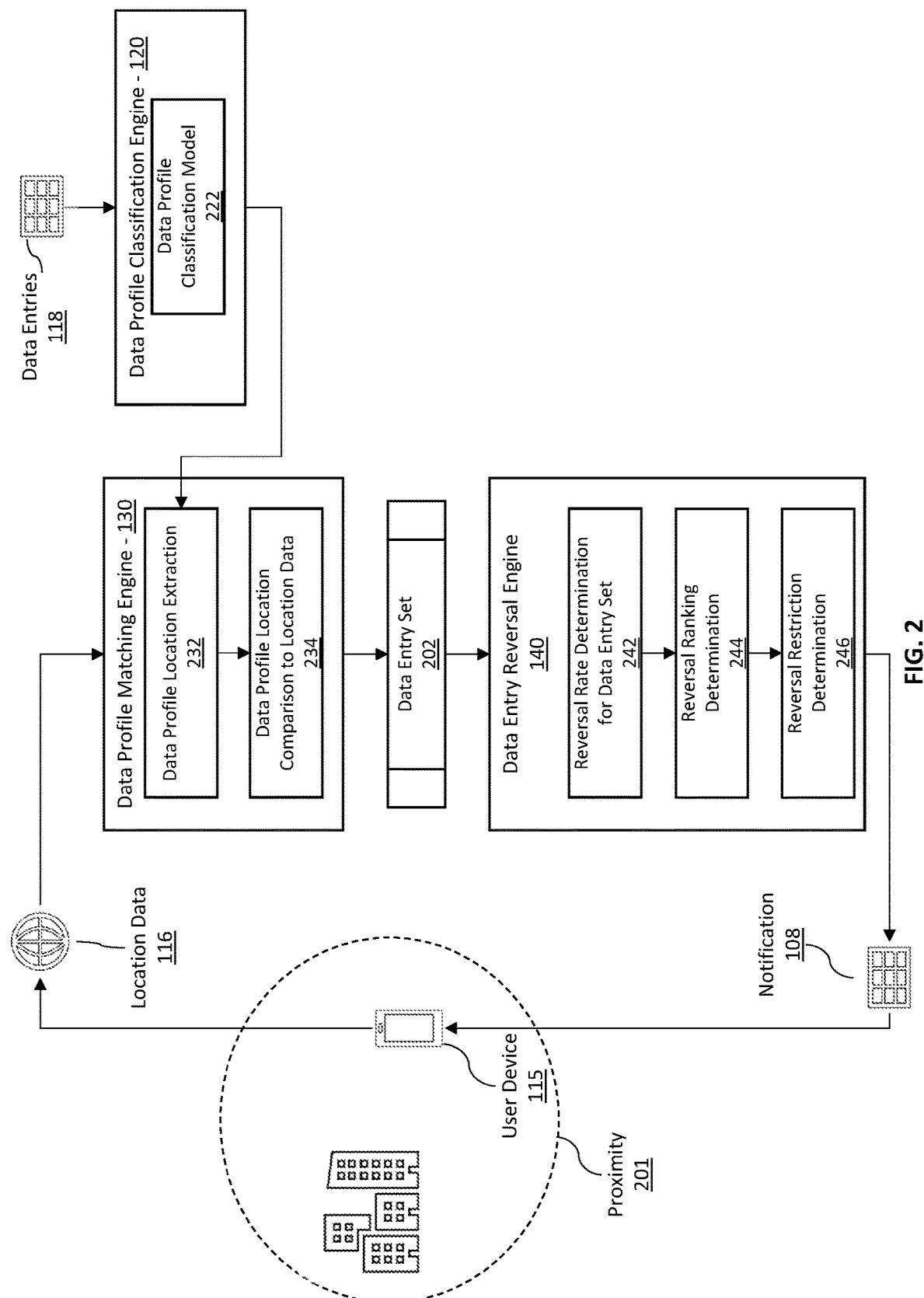

FIG. 2 illustrates a flowchart of another illustrative methodology for the data restriction recognition system 100 for inferring restrictions on data entry operations in accordance with one or more embodiments of the present disclosure.

In some embodiments, the data profile classification engine 120 may receive the data entries 118 for one or more entity data profiles. Using a data profile classification model 222, the data profile classification engine 120 may generate an annotation predicting the capability of each entity data profile for electronic activity reversals. In some embodiments, the data profile classification engine 120 may use a suitable classification machine learning model to ingest features of each data entry 118 in each entity data profile. In some embodiments, the features may include, e.g., one or more feature vector(s) encoding attributes such as, e.g., a user identifier associated with each data entry, a third-party entity identifier associated with each data entry, an activity type identifier, an activity value or activity quantity, a time data item, a location data item, a date data item, a device type or device identifier associated with the initiator device(s) 117, an activity description, or other attributes representing characteristics of each data entry.

In some embodiments, the data profile classification model 222 may include parameters trained to correlate the features to when the entity data profile associated with the features has capability for electronic activity reversals. Accordingly, the data profile classification model 222 may ingest the features of each data entry in a particular entity data profile and output an annotation as having the capability for electronic activity reversal or not having the capability for electronic activity reversal. In some embodiments, the data profile classification engine 120 may tag the particular entity data profile with the annotation to identify the particular entity data profile as having the capability for electronic activity reversal or not. The data profile classification engine 120 may tag each entity data profile based on the data entries 118 associated with entity data profile.

In some embodiments, a data profile matching engine 130 may ingest the location data 116 form the user device 115 and the entity data profiles tagged as having the capability for electronic activity reversal. In some embodiments, the user device 115 may be in a proximity 201 to physical entity locations. Accordingly, a data profile location extraction 232 may extract a location attribute of each data entry in each entity data profiles tagged as having the capability for electronic activity reversal. As a result, the data profile location extraction 232 may include determining an entity location of each entity data profile based on the location attributes of the data entries 118.

In some embodiments, where an entity data profile has data entries 118 with different locations, the data profile matching engine 130 may split the entity data profile according to the different locations to create location-specific entity data profiles for each location of each entity data profile. In some embodiments, each entity data profile, including location-specific entity data profiles, may be tagged with the associated location to create entity-location data profiles.

In some embodiments, the nearby entity data profiles may undergo a data profile location comparison to location data 234. In some embodiments, the data profile matching engine 130 may receive the location data 116 and identify the proximity 201. For example, the proximity 201 may include a distance of, e.g., within a mile, within half a mile, within a quarter of a mile, within 100 yards, within 50 yards, within 25 yards, within 10 yards, or other suitable distance, of a location of the user device 115. The location data 116 may identify the location of the user device 115, and thus the data profile location extraction 232 may determine the proximity 201 as an area within a radius of the location data 116 defined by the distance.

In some embodiments, based on the proximity, the data profile matching engine 130 may test the location attribute of each entity-location data profiles. In some embodiments, the data profile location extraction 232 may select nearby entity data profiles associated with the entity-location data profiles that are within the proximity 201 based on the proximity and the location attribute. Accordingly, in some embodiments, the data profile matching engine 130 may output a data entry set 202 having nearby entity data profiles tagged as having the capability for electronic activity reversal that include data entries 118 for entity locations within the proximity 201.

In some embodiments, the data entry set 202 may be provided to a data entry reversal engine 140. In some embodiments, the data entry reversal engine 140 may analyze each entity-location data profile of the data entry set 202 to determine a reversal metric for each entity-location data profile. Accordingly, the data entry reversal engine 140 may perform a reversal rate determine for the data entry set 242. Accordingly, in some embodiments, a data entry reversal engine 140 may analyze the data entries associated with each entity-location data profile of the data entry set 202. In some embodiments, the data entry reversal engine 140 may access the data entries of each entity-location data profile of the data entry set 202 and identify one or more data entries that have a subsequent reversal data entry.

In some embodiments, the data entry reversal engine 140 may, for each entity-location data profile, compare the attributes of each data entry to each other data entry. Where a data entry in a particular entity-location data profile has attributes that match a later (e.g., in time) data entry in the same selected entity data profile and having a reversed quantity, value, amount or other quantification, the later data entry may be identified as a reversal of the earlier data entry.

In some embodiments, data entries may be matched according to a measure of similarity of individual or combinations of attributes represented in the data entries. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same.

In some embodiments, similarity may be measured between each individual attribute separately, and the respective similarity scores summed, averaged, or otherwise combined to produce a measure of similarity of two data entries. In some embodiments, the similarity may instead or in addition be measured for a combination of the device identifier, device type identifier and location identify. For example, a hash or group key may be generated by combining the device identifier, device type identifier and location identify. The hash may include a hash functioning take as input each of attribute or a subset of attributes of a particular data entry. The group key may be produced by creating a single string, list, or value from combining each of, e.g., a string, list or value representing each individual attribute of the particular data entry. The similarity between two data entries may then be measured as the similarity between the associated hashes and/or group keys. The measured similarity may then be compared against the predetermined similarity score to determine candidate data entries that are candidates as matching to each other.

In some embodiments, the data entry reversal engine 140 may implement rules for reversal rate determination for the data entry set 242 that define limits on when a pair of data entries are a match regardless of similarity score. In some embodiments, a first rule may include that the activity value or activity quantity attributes of each data entry of the pair of data entries may have opposite values (e.g., one data entry having a positive amount and one data entry having a negative amount, or any other suitable type of opposite values).

In some embodiments, the data entry reversal engine 140 may iteratively search through each data entry of an entity-location data profile of the data entry set 202 to compare each data entry with each later in time data entry in the entity data profile. Thus, each data entry having an associated reversal data entry can be identified by restricting the comparison to the data entries that occurred later in time.

In some embodiments, the data entry reversal engine 140 may use the pairs of data entry and reversal data entry of each entity-location data profile to perform a reversal ranking determination 244. In some embodiments, by ranking each entity-location data profile according to a reversal metric, the data entry reversal engine 140 may determine a relative likelihood of each entity-location data profile to enable electronic activity reversal.

In some embodiments, to rank the entity-location data profiles of the data entry set 202, the data entry reversal engine 140 may determine a reversal metric for each entity-location data profile. In some embodiments, the reversal metric may include any suitable statistical metric of data entry reversals, such as, e.g., reversal rates over predetermined time intervals (e.g., each week, each two weeks, each month, each fiscal or calendar quarter, each fiscal or calendar half, each fiscal or calendar year, among other intervals or any combination thereof), number of reversal data entries per number of total data entries, number of reversal data entries per number of data entries not having an associated reversal data entry, among metrics or any combination thereof.

In some embodiments, the data entry reversal engine 140 may compare the reversal metric to a predetermined threshold to perform a reversal restriction determination 246. For example, where the entity is a merchant, the merchant may rarely allow returns of electronic payments even where the merchant is of a type that allows returns on purchases, however other examples may be included (e.g., cloud storage file sharing, network communications, social media communications, etc.).

In some embodiments, the predetermined threshold of the reversal restriction determination 246 may include, e.g., a relative measure. The reversal metric of each entity data profile may be compared to, e.g., rank each entity. The rank may include a ranked list where a higher rate of reversals increases the rank in the list, or may be percentile based, where the distribution of reversal metrics across entities is used to determine the percentile in rate of reversals for each entity. In some embodiments, where a particular entity is ranked in, e.g., a bottom 10 percent, bottom 20 percent, bottom 25 percent, etc., of the ranked list and/or distribution, the particular entity may be identified as having an electronic activity reversal restriction.

In some embodiments, where the entities in the proximity of the user device 115 based on the location data 116 include one or more entities having an, electronic activity reversal restriction the data restriction recognition system 100 may update the notification 108 or generate a new notification 108 to indicate the electronic activity reversal restriction for each entity. As a result, the user may be alerted to reversal-capable entities that restrict reversals.

Figure 3:
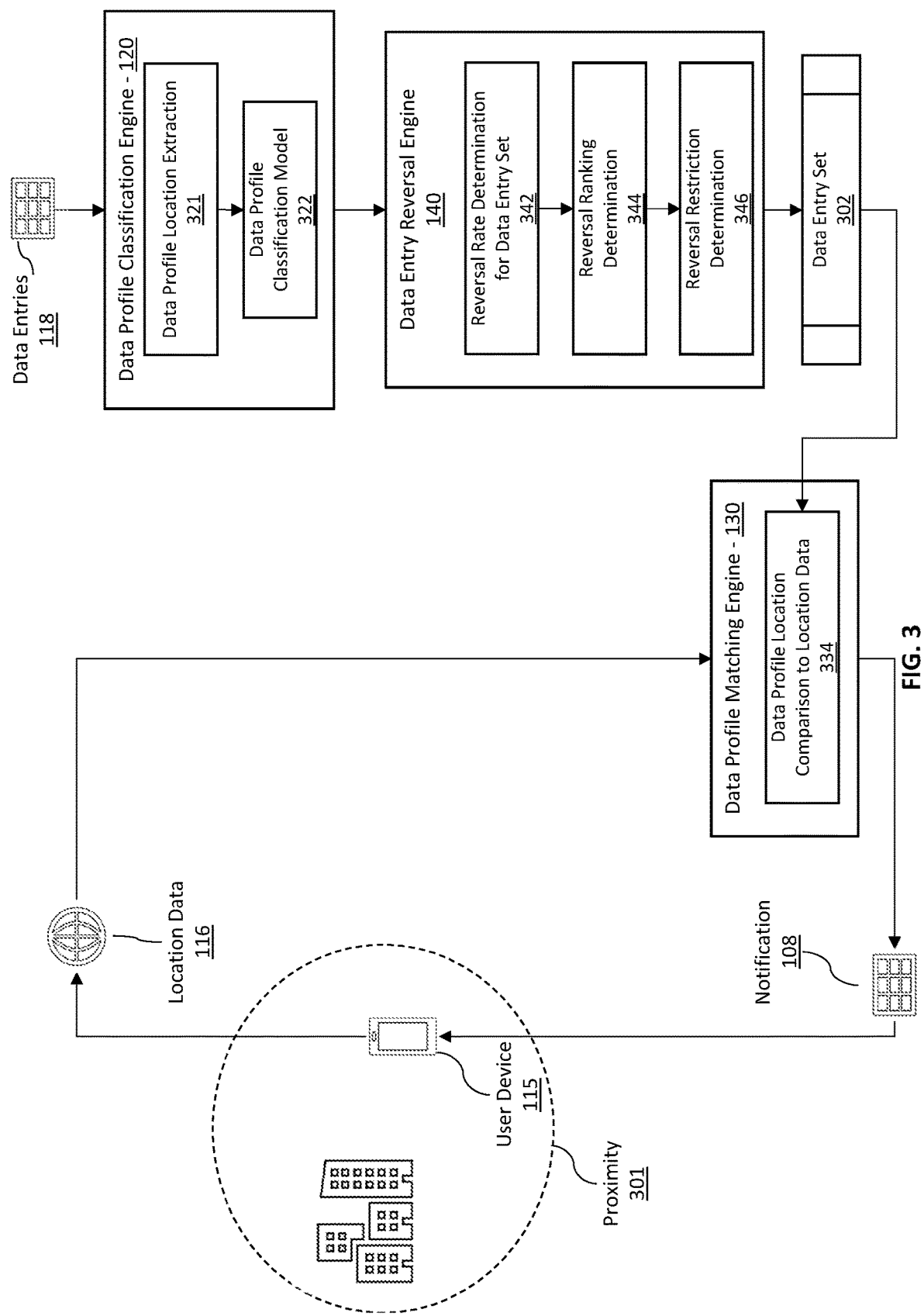

FIG. 3 illustrates a flowchart of another illustrative methodology for the data restriction recognition system 100 for inferring restrictions on data entry operations in accordance with one or more embodiments of the present disclosure.

In some embodiments, the data profile classification engine 120 may receive the data entries 118 for one or more entity data profiles. In some embodiments, a data profile classification engine 120 may ingest the data entries 118 of each entity data profile. Accordingly, a data profile location extraction 321 extract a location attribute of each data entry in each entity data profiles. As a result, the data profile location extraction 321 may include determining an entity location of each entity data profile based on the location attributes of the data entries 118.

In some embodiments, where an entity data profile has data entries 118 with different locations, the data profile classification engine 120 may split the entity data profile according to the different locations to create location-specific entity data profiles for each location of each entity data profile. In some embodiments, each entity data profile, including location-specific entity data profiles, may be tagged with the associated location to create entity-location data profiles.

In some embodiments, using a data profile classification model 322, the data profile classification engine 120 may generate an annotation predicting the capability of each entity-location data profile for electronic activity reversals. In some embodiments, the data profile classification engine 120 may use a suitable classification machine learning model to ingest features of each data entry 118 in each entity data profile. In some embodiments, the features may include, e.g., one or more feature vectors encoding attributes such as, e.g., a user identifier associated with each data entry, a third-party entity identifier associated with each data entry, an activity type identifier, an activity value or activity quantity, a time data item, a location data item, a date data item, a device type or device identifier associated with the initiator device(s) 117, an activity description, or other attributes representing characteristics of each data entry.

In some embodiments, the data profile classification model 322 may include parameters trained to correlate the features to when the entity-location data profile associated with the features has capability for electronic activity reversals. Accordingly, the data profile classification model 322 may ingest the features of each data entry in a particular entity-location data profile and output an annotation as having the capability for electronic activity reversal or not having the capability for electronic activity reversal. In some embodiments, the data profile classification engine 120 may tag the particular entity data profile with the annotation to identify the particular entity-location data profile as having the capability for electronic activity reversal or not. The data profile classification engine 120 may tag each entity-location data profile based on the data entries 118 associated with entity-location data profile.

In some embodiments, the data profile classification engine 120 may output the entity-location data profiles tagged with respective locations and as having the capability for electronic activity reversal. In some embodiments, the entity-location data profiles may be provided to a data entry reversal engine 140. In some embodiments, the data entry reversal engine 140 may analyze each entity-location data profile to determine a reversal metric for each entity-location data profile. Accordingly, the data entry reversal engine 140 may perform a reversal rate determine for the data entry set 342. Accordingly, in some embodiments, a data entry reversal engine 140 may analyze the data entries associated with each entity-location data profile. In some embodiments, the data entry reversal engine 140 may access the data entries of each entity-location data profile and identify one or more data entries that have a subsequent reversal data entry.

In some embodiments, the data entry reversal engine 140 may, for each entity-location data profile, compare the attributes of each data entry to each other data entry. Where a data entry in a particular entity-location data profile has attributes that match a later (e.g., in time) data entry in the same selected entity data profile and having a reversed quantity, value, amount or other quantification, the later data entry may be identified as a reversal of the earlier data entry.

In some embodiments, data entries may be matched according to a measure of similarity of individual or combinations of attributes represented in the data entries. In some embodiments, the measure of similarity may include, e.g., an exact match or a predetermined similarity score according to, e.g., Jaccard similarity, Jaro-Winkler similarity, Cosine similarity, Euclidean similarity, Overlap similarity, Pearson similarity, Approximate Nearest Neighbors, K-Nearest Neighbors, among other similarity measure. The predetermined similarity score may be any suitable similarity score according to the type of electronic activity to identify a measured attribute of any two data entries as the same.

In some embodiments, similarity may be measured between each individual attribute separately, and the respective similarity scores summed, averaged, or otherwise combined to produce a measure of similarity of two data entries. In some embodiments, the similarity may instead or in addition be measured for a combination of the device identifier, device type identifier and location identify. For example, a hash or group key may be generated by combining the device identifier, device type identifier and location identify. The hash may include a hash functioning take as input each of attribute or a subset of attributes of a particular data entry. The group key may be produced by creating a single string, list, or value from combining each of, e.g., a string, list or value representing each individual attribute of the particular data entry. The similarity between two data entries may then be measured as the similarity between the associated hashes and/or group keys. The measured similarity may then be compared against the predetermined similarity score to determine candidate data entries that are candidates as matching to each other.

In some embodiments, the data entry reversal engine 140 may implement rules for reversal rate determination for the data entry set 342 that define limits on when a pair of data entries are a match regardless of similarity score. In some embodiments, a first rule may include that the activity value or activity quantity attributes of each data entry of the pair of data entries may have opposite values (e.g., one data entry having a positive amount and one data entry having a negative amount, or any other suitable type of opposite values).

In some embodiments, the data entry reversal engine 140 may iteratively search through each data entry of an entity-location data profile to compare each data entry with each later in time data entry in the entity-location data profile. Thus, each data entry having an associated reversal data entry can be identified by restricting the comparison to the data entries that occurred later in time.

In some embodiments, the data entry reversal engine 140 may use the pairs of data entry and reversal data entry of each entity-location data profile to perform a reversal ranking determination 344. In some embodiments, by ranking each entity-location data profile according to a reversal metric, the data entry reversal engine 140 may determine a relative likelihood of each entity-location data profile to enable electronic activity reversal.

In some embodiments, to rank the entity-location data profiles of the data entry set 302, the data entry reversal engine 140 may determine a reversal metric for each entity-location data profile. In some embodiments, the reversal metric may include any suitable statistical metric of data entry reversals, such as, e.g., reversal rates over predetermined time intervals (e.g., each week, each two weeks, each month, each fiscal or calendar quarter, each fiscal or calendar half, each fiscal or calendar year, among other intervals or any combination thereof), number of reversal data entries per number of total data entries, number of reversal data entries per number of data entries not having an associated reversal data entry, among metrics or any combination thereof.

In some embodiments, the data entry reversal engine 140 may compare the reversal metric to a predetermined threshold to perform a reversal restriction determination 346. For example, where the entity is a merchant, the merchant may rarely allow returns of electronic payments even where the merchant is of a type that allows returns on purchases, however other examples may be included (e.g., cloud storage file sharing, network communications, social media communications, etc.).

In some embodiments, the predetermined threshold of the reversal restriction determination 346 may include, e.g., a relative measure. The reversal metric of each entity data profile may be compared to, e.g., rank each entity. The rank may include a ranked list where a higher rate of reversals increases the rank in the list, or may be percentile based, where the distribution of reversal metrics across entities is used to determine the percentile in rate of reversals for each entity. In some embodiments, where a particular entity is ranked in, e.g., a bottom 10 percent, bottom 30 percent, bottom 35 percent, etc., of the ranked list and/or distribution, the particular entity may be identified as having an electronic activity reversal restriction.

In some embodiments, the ranked list and/or distribution may be updated by the data profile classification engine 120 and the data entry reversal engine 140 periodically or on demand, or both. For example, the data profile classification engine 120 may update the classification of each entity-location data profile, and the data entry reversal engine 140 may determine the distribution and/or ranked list of reversal metrics across entity-location data profiles on a periodic basis, e.g., every day, every night, every week, every month, every fiscal or calendar quarter, every fiscal or calendar half, every fiscal or calendar year, or any combination thereof.

In some embodiments, upon ranking each entity-location data profile, the data entry reversal engine 140 may output a data entry set 302 having each entity-location data profile having an electronic activity reversal restriction where each entity-location data profile includes a reversal metric. In some embodiments, the data entry set 302 may include, e.g., each entity-location data profile having the reversal metric below the predetermined threshold and tagged as having the electronic activity reversal restriction. In some embodiments, the data entry set 302 may be provided directly to the data profile matching engine 130, or may be stored, e.g., in the storage device 101 for later access by the data profile matching engine 130. By tagging the entity-location data profiles with the electronic activity reversal restriction, the entity-location data profiles with electronic activity reversal restrictions may be easily searched and identified for access by data profile matching engine 130.

In some embodiments, the entity-location entity data profiles with the electronic activity reversal restriction may undergo a data profile location comparison to location data 334. In some embodiments, the data profile matching engine 130 may receive the location data 116 and identify the proximity 301. For example, the proximity 301 may include a distance of, e.g., within a mile, within half a mile, within a quarter of a mile, within 100 yards, within 50 yards, within 35 yards, within 10 yards, or other suitable distance, of a location of the user device 115. The location data 116 may identify the location of the user device 115, and thus the data profile location extraction 334 may determine the proximity 301 as an area within a radius of the location data 116 defined by the distance.

In some embodiments, based on the proximity, the data profile matching engine 130 may test the location attribute of each entity-location data profiles. In some embodiments, the data profile location extraction 334 may select nearby entity data profiles associated with the entity-location data profiles that are within the proximity 301 based on the proximity and the location attribute.

In some embodiments, where the entities in the proximity of the user device 115 based on the location data 116 include one or more entities having an, electronic activity reversal restriction the data restriction recognition system 100 may update the notification 108 or generate a new notification 108 to indicate the electronic activity reversal restriction for each entity. As a result, the user may be alerted to reversal-capable entities that restrict reversals.

Figure 4:
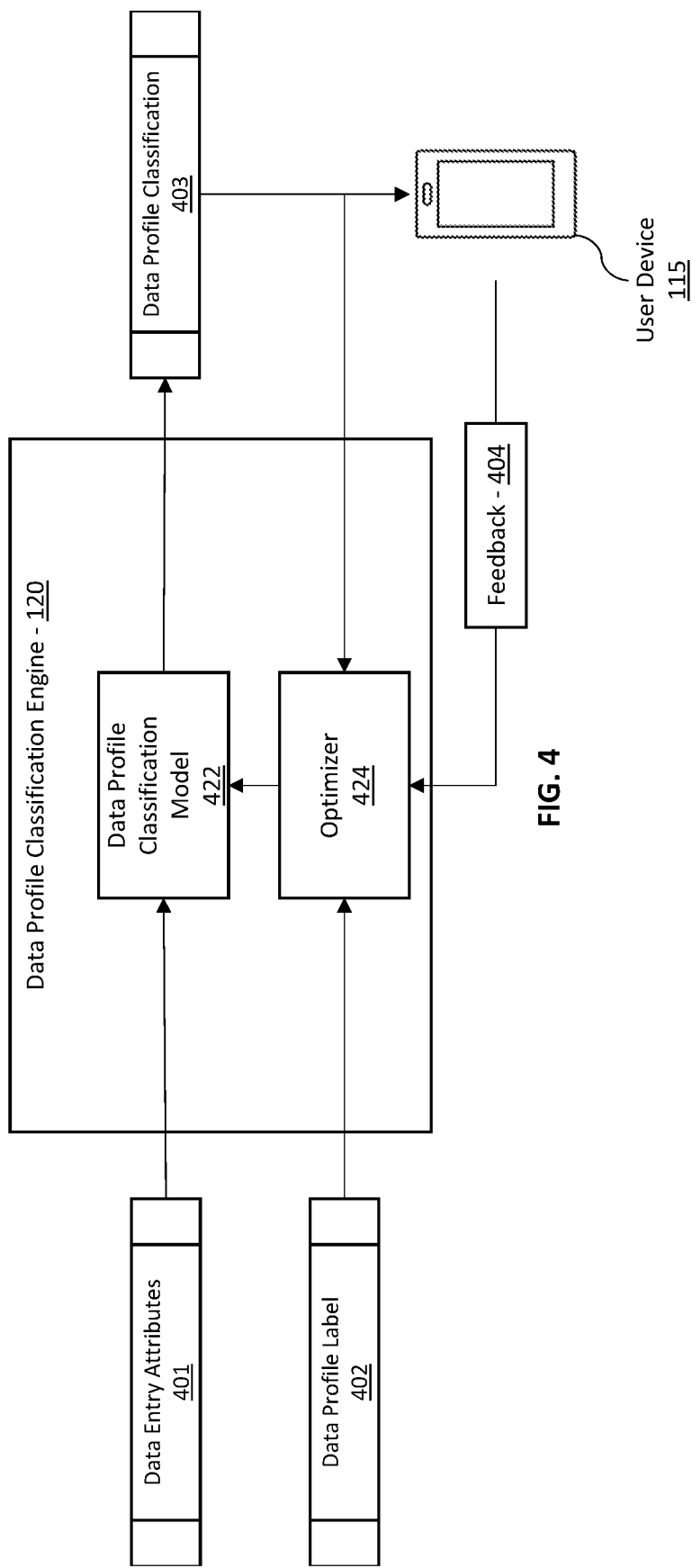

FIG. 4 is a block diagram of another exemplary data profile classification engine 120 for the data restriction recognition system 100 for inferring restrictions on data entry operations in accordance with one or more embodiments of the present disclosure.

In some embodiments, the data profile classification engine 120 may utilize the data profile classification model 422 to predict a data profile classification 403 for an entity data profile based on the data entry attributes 401 of data entries in the entity data profile. In some embodiments, the data entry attributes 401 may be provided to the data profile classification engine 120 as a feature vector and/or feature map. In some embodiments, the feature vector and/or feature map may include, e.g., the data entry attributes 401 of a particular data entry, or a concatenation of the data entry attributes 401 of data entries in the entity data profile. In some embodiments, the feature vector and/or feature map may be pre-constructed and provided to the data profile classification engine 120, or the data profile classification engine 120 may include a feature selector and/or feature extractor to generate the feature vector and/or feature map upon receiving the data entry attributes 401.

In some embodiments, the data entry attributes 401 may be provided for the data profile classification engine 120 in, e.g., a rolling time window to update the data profile classification 403 on a current set of data entries to account for changes in electronic activity reversals and restrictions thereof. For example, in some embodiments, the feature vector and/or feature map may include a concatenation of the data attributes 401 of data entries in a predetermined time span in the entity data profile (e.g., in the last week, last two weeks, last month, last two months, last three months, last four months, last six months, last eight months, last ten months, last year, last two years, etc.).

In some embodiments, to train the data profile classification model 422, the data profile classification model 422 generate predictions for data entry attributes 401 that are paired with data profile labels 402 labeling the entity data profile associated with the data entry attributes 401 according to when the entity data profile has an electronic activity reversal capability. Thus, the data attributes 401 and the data profile labels 402 form a ground truth training dataset. Accordingly, in some embodiments, the data profile classification model 422 may ingest the data entry attributes 401, output the data profile classification 403 and train parameters of the data profile classification model 422 according to a difference between the data profile classification 403 and the data profile labels 402.

In some embodiments, the data profile classification model 422 ingests the feature vector and/or feature map and produces a prediction of a data profile classification 403 for each feature vector and/or map. In some embodiments, to produce this prediction, the data profile classification model 422 may include a machine learning model including a classification model, such as, e.g., a convolutional neural network (CNN), a Naive Bayes classifier, decision trees, random forest, support vector machine (SVM), K-Nearest Neighbors, or any other suitable algorithm for a classification model. In some embodiments, for computational efficiency while preserving accuracy of predictions, the data profile classification model 422 may advantageously include a random forest classification model Accordingly, the data profile classification model 422 ingests a feature vector and processes the attributes encoded therein using the classification model to produce a model output vector. In some embodiments, the model output vector may be decoded to generate a label including the data profile classification 403.

In some embodiments, the model output vector may include or may be decoded to reveal a numerical output, e.g., a probability value between 0 and 1. In some embodiments, the probability value may indicate a degree of probability that entity data profile of the feature vector is of a type that is capable of initiating electronic activity reversals ("an electronic activity reversal capability" or "reversal capable entity data profile"). In some embodiments, the data profile classification model 422 may test the probability value against a probability threshold, where a probability value greater than the probability threshold indicates, e.g., that the entity data profile is a reversal capable entity data profile, or that the entity data profile is not a reversal capable entity data profile. For example, the probability threshold can be, e.g., greater than 0.5, greater than 0.6, greater than 0.7, greater than 0.8, greater than 0.9, or other suitable threshold value. In some embodiments, the data profile classification model 422 may produce the data profile classification 403 based on the probability value and the probability threshold. For example, the data profile classification 403 may include a classification as a reversal capable entity data profile where the probability value is greater than the probability threshold. However, the data profile classification model 422 may be configured such that the data profile classification 403 may include a classification as not a reversal capable entity data profile where the probability value is greater than the probability threshold.

In some embodiments, the data profile classification model 422 may be trained based on the data profile classification 403 and the data profile labels 402. Based on the difference between the data profile classification 403 and the data profile labels 402, the parameters of the classification model of the data profile classification model 422 may be updated to improve the accuracy of the data profile classification 403 in subsequent predictions.

In some embodiments, training is performed using the optimizer 424. In some embodiments, the data profile classification 403 may be fed back to the optimizer 424. The optimizer 424 may also ingest the data profile labels 402. In some embodiments, the optimizer 424 may employ a loss function, such as, e.g., Hinge Loss, Multi-class SVM Loss, Cross Entropy Loss, Negative Log Likelihood, or other suitable classification loss function. The loss function determines an error based on the data profile labels 402 and the data profile classification 403. In some embodiments, the optimizer 424 may, e.g., backpropagate the error to the data profile classification model 422 to update the parameters using, e.g., gradient descent, heuristic, convergence or other optimization techniques and combinations thereof.

Figure 5:
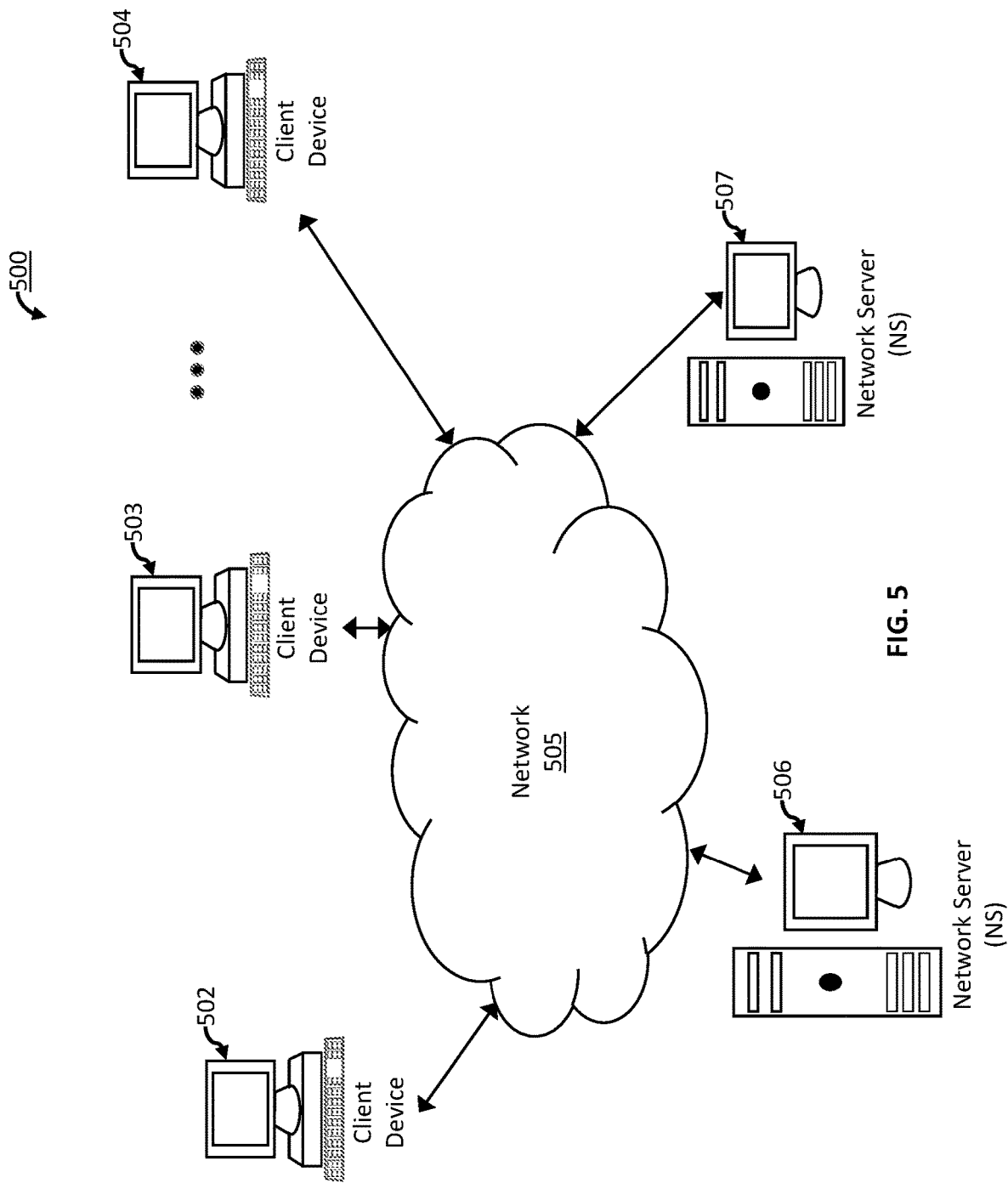

FIG. 5 depicts a block diagram of an exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 500 may be configured to manage a large number of members and concurrent transactions, as detailed herein. In some embodiments, the exemplary computer-based system and platform 500 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 5, member computing device 502, member computing device 503 through member computing device 504 (e.g., clients) of the exemplary computer-based system and platform 500 may include virtually any computing device capable of receiving and sending a message over a network (e.g., cloud network), such as network 505, to and from another computing device, such as servers 506 and 507, each other, and the like. In some embodiments, the member devices 502-504 may be personal computers, multiprocessor systems, microprocessor-based or programmable consumer electronics, network PCs, and the like. In some embodiments, one or more member devices within member devices 502-504 may include computing devices that typically connect using a wireless communications medium such as cell phones, smart phones, pagers, walkie talkies, radio frequency (RF) devices, infrared (IR) devices, citizens band radio, integrated devices combining one or more of the preceding devices, or virtually any mobile computing device, and the like. In some embodiments, one or more member devices within member devices 502-504 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, OFDM, OFDMA, LTE, satellite, ZigBee, etc.). In some embodiments, one or more member devices within member devices 502-504 may include may run one or more applications, such as Internet browsers, mobile applications, voice calls, video games, videoconferencing, and email, among others. In some embodiments, one or more member devices within member devices 502-504 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 502-504 may be specifically programmed by either Java, .Net, QT, C, C++, Python, PHP and/or other suitable programming language. In some embodiments of the device software, device control may be distributed between multiple standalone applications. In some embodiments, software components/applications can be updated and redeployed remotely as individual units or as a full software suite. In some embodiments, a member device may periodically report status or send alerts over text or email. In some embodiments, a member device may contain a data recorder which is remotely downloadable by the user using network protocols such as FTP, SSH, or other file transfer mechanisms. In some embodiments, a member device may provide several levels of user interface, for example, advance user, standard user. In some embodiments, one or more member devices within member devices 502-504 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 505 may provide network access, data transport and/or other services to any computing device coupled to it. In some embodiments, the exemplary network 505 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 505 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 505 may include and implement, as an alternative or in conjunction with one or more of the above, a WiMAX architecture defined by the WiMAX forum. In some embodiments and, optionally, in combination of any embodiment described above or below, the exemplary network 505 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 505 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, OFDM, OFDMA, LTE, satellite and any combination thereof. In some embodiments, the exemplary network 505 may also include mass storage, such as network attached storage (NAS), a storage area network (SAN), a content delivery network (CDN) or other forms of computer or machine readable media.

In some embodiments, the exemplary server 506 or the exemplary server 507 may be a web server (or a series of servers) running a network operating system, examples of which may include but are not limited to Apache on Linux or Microsoft IIS (Internet Information Services). In some embodiments, the exemplary server 506 or the exemplary server 507 may be used for and/or provide cloud and/or network computing. Although not shown in FIG. 5, in some embodiments, the exemplary server 506 or the exemplary server 507 may have connections to external systems like email, SMS messaging, text messaging, ad content providers, etc. Any of the features of the exemplary server 506 may be also implemented in the exemplary server 507 and vice versa.

In some embodiments, one or more of the exemplary servers 506 and 507 may be specifically programmed to perform, in non-limiting example, as authentication servers, search servers, email servers, social networking services servers, Short Message Service (SMS) servers, Instant Messaging (IM) servers, Multimedia Messaging Service (MMS) servers, exchange servers, photo-sharing services servers, advertisement providing servers, financial/banking-related services servers, travel services servers, or any similarly suitable service-base servers for users of the member computing devices 501-504.

In some embodiments and, optionally, in combination of any embodiment described above or below, for example, one or more exemplary computing member devices 502-504, the exemplary server 506, and/or the exemplary server 507 may include a specifically programmed software module that may be configured to send, process, and receive information using a scripting language, a remote procedure call, an email, a tweet, Short Message Service (SMS), Multimedia Message Service (MMS), instant messaging (IM), an application programming interface, Simple Object Access Protocol (SOAP) methods, Common Object Request Broker Architecture (CORBA), HTTP (Hypertext Transfer Protocol), REST (Representational State Transfer), SOAP (Simple Object Transfer Protocol), MLLP (Minimum Lower Layer Protocol), or any combination thereof.

Figure 6:
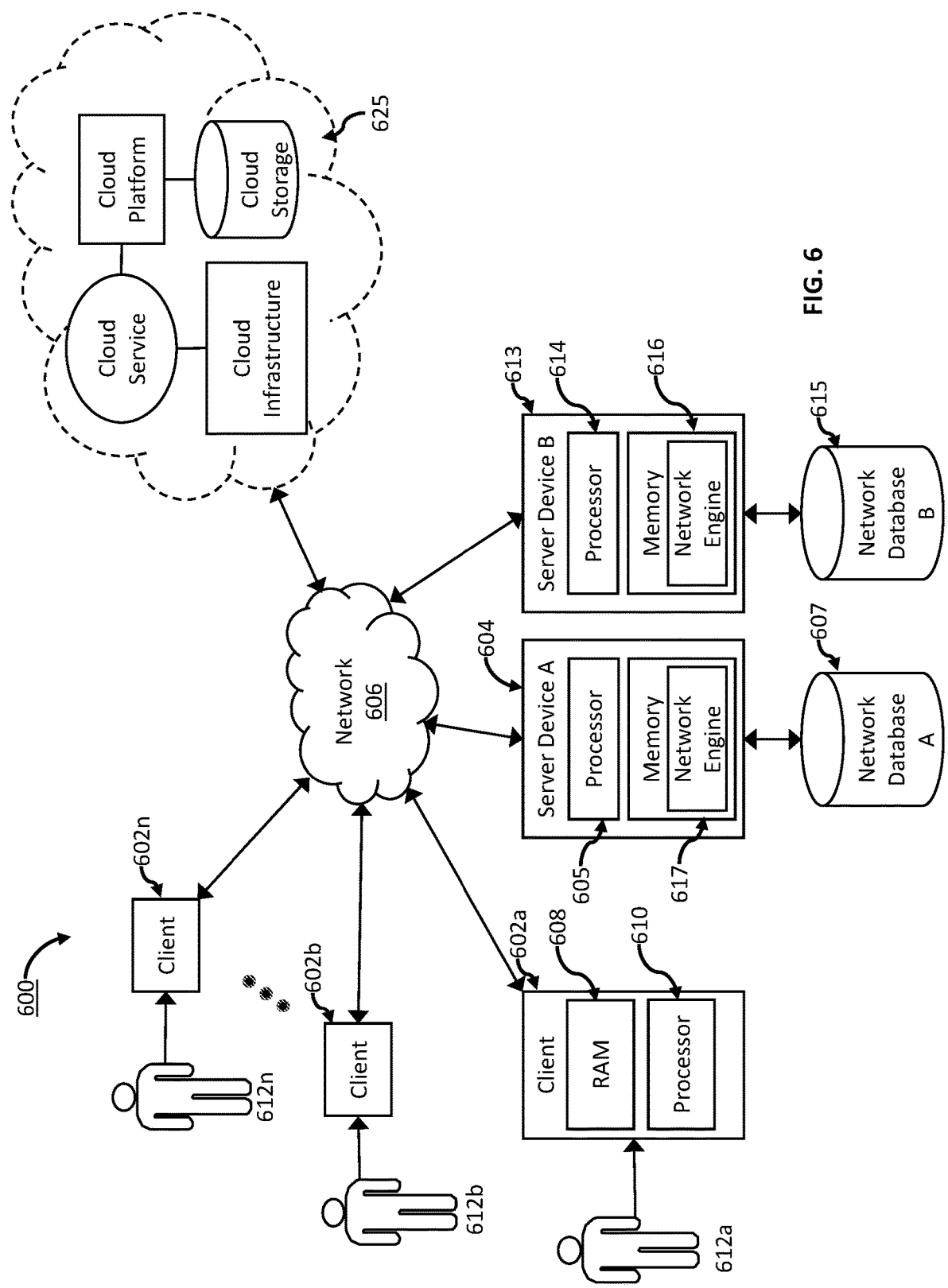

FIG. 6 depicts a block diagram of another exemplary computer-based system and platform 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing device 602a, member computing device 602b through member computing device 602n shown each at least includes a computer-readable medium, such as a random-access memory (RAM) 608 coupled to a processor 610 or FLASH memory. In some embodiments, the processor 610 may execute computer-executable program instructions stored in memory 608. In some embodiments, the processor 610 may include a microprocessor, an ASIC, and/or a state machine. In some embodiments, the processor 610 may include, or may be in communication with, media, for example computer-readable media, which stores instructions that, when executed by the processor 610, may cause the processor 610 to perform one or more steps described herein. In some embodiments, examples of computer-readable media may include, but are not limited to, an electronic, optical, magnetic, or other storage or transmission device capable of providing a processor, such as the processor 610 of client 602a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 602a through 602n may also comprise a number of external or internal devices such as a mouse, a CD-ROM, DVD, a physical or virtual keyboard, a display, or other input or output devices. In some embodiments, examples of member computing devices 602a through 602n (e.g., clients) may be any type of processor-based platforms that are connected to a network 606 such as, without limitation, personal computers, digital assistants, personal digital assistants, smart phones, pagers, digital tablets, laptop computers, Internet appliances, and other processor-based devices. In some embodiments, member computing devices 602a through 602n may be specifically programmed with one or more application programs in accordance with one or more principles/methodologies detailed herein. In some embodiments, member computing devices 602a through 602n may operate on any operating system capable of supporting a browser or browser-enabled application, such as Microsoft™ Windows™, and/or Linux. In some embodiments, member computing devices 602a through 602n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 602a through 602n, user 612a, user 612b through user 612n, may communicate over the exemplary network 606 with each other and/or with other systems and/or devices coupled to the network 606. As shown in FIG. 6, exemplary server devices 604 and 613 may include processor 605 and processor 614, respectively, as well as memory 617 and memory 616, respectively. In some embodiments, the server devices 604 and 613 may be also coupled to the network 606. In some embodiments, one or more member computing devices 602a through 602n may be mobile clients.

In some embodiments, at least one database of exemplary databases 607 and 615 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 7:
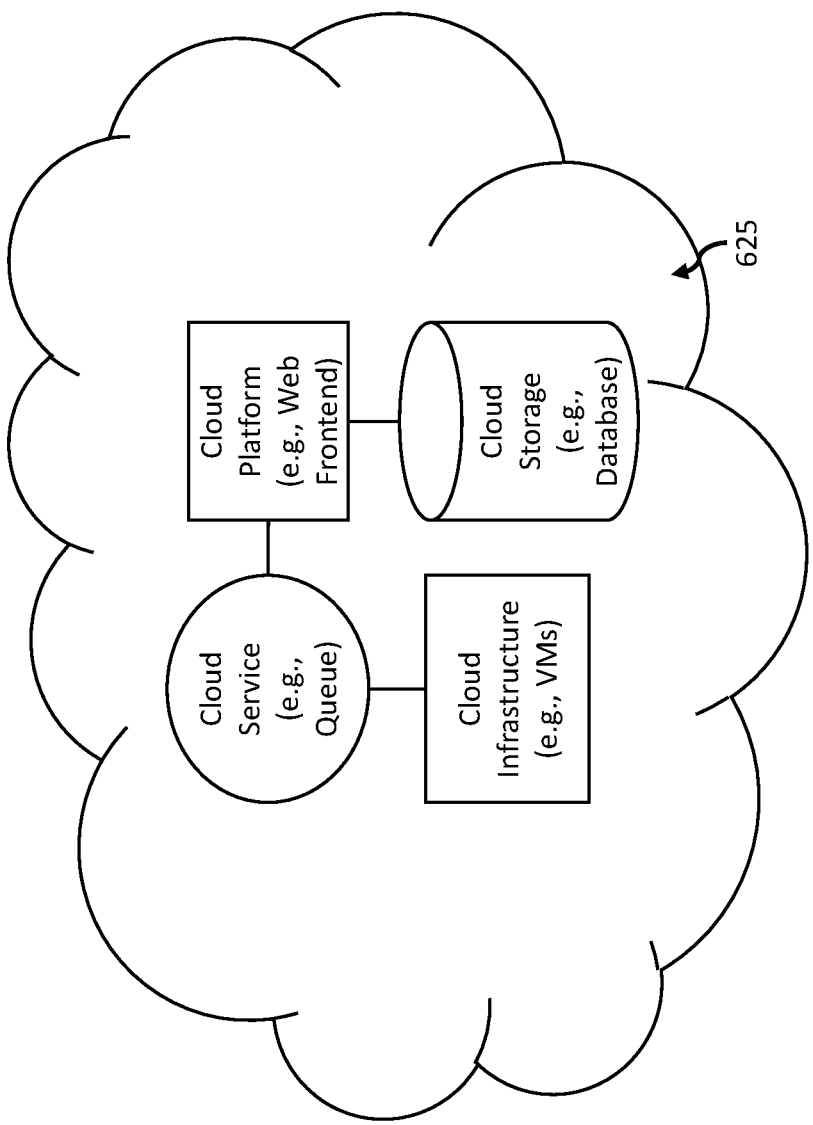
Figure 8:
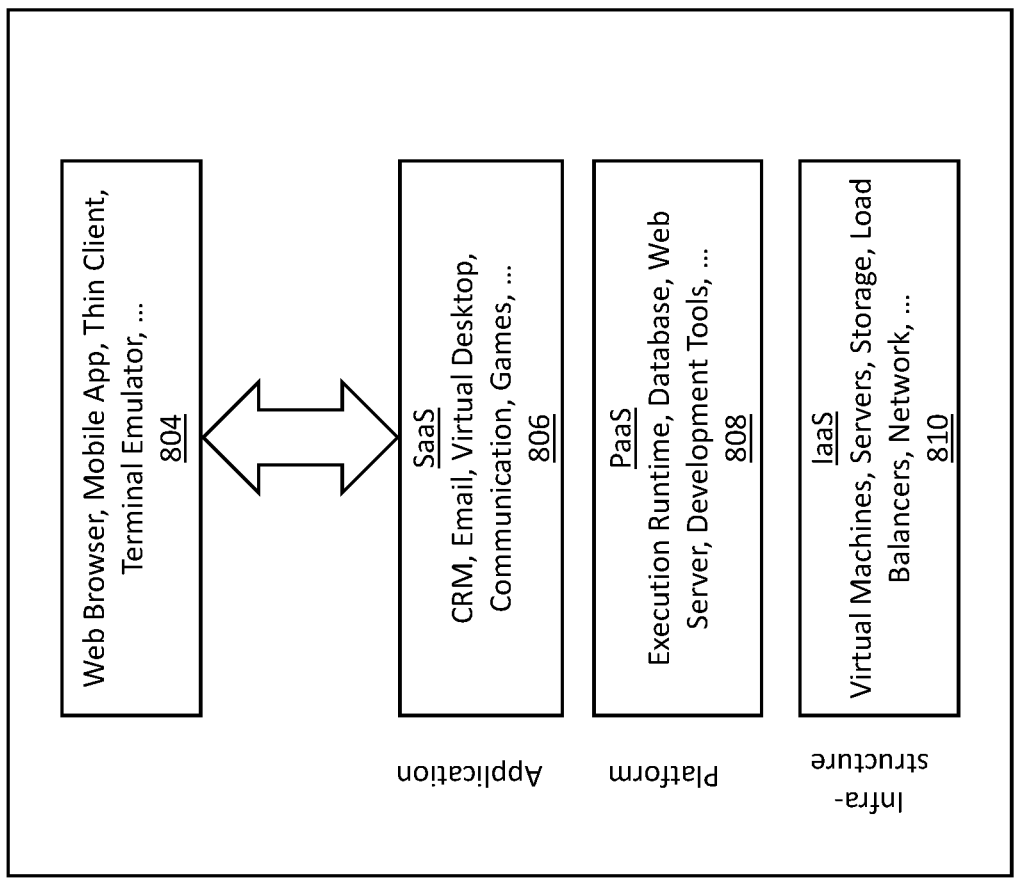

In some embodiments, the exemplary inventive computer-based systems/platforms, the exemplary inventive computer-based devices, and/or the exemplary inventive computer-based components of the present disclosure may be specifically configured to operate in a cloud computing/architecture 625 such as, but not limiting to: infrastructure a service (IaaS) 810, platform as a service (PaaS) 808, and/or software as a service (SaaS) 806 using a web browser, mobile app, thin client, terminal emulator or other endpoint 804. FIGS. 7 and 8 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiments, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining when an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetB SD, OpenBSD; (2) Linux; (3) Microsoft Windows™; (4) OpenVMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18) QNX™; (19) Mono; (20) Google Blink; (21) Apple WebKit; (22) Mozilla Gecko™; (23) Mozilla XUL; (24) .NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent transactions and/or users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999, 999,999,999), and so on.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

In some embodiments, the term "location data 116" may refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, the terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTRO, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method comprising:
  receiving, by at least one processor, location data from a computing device associated with a user, wherein the physical location data represents a physical location of the computing device;
  utilizing, by the at least one processor, a data profile classification machine learning model to classify a particular data profile according to a data profile classification type based at least in part on a history of data entries associated with the particular data profile when the physical location is within a predetermined proximity of another physical location associated with the particular data profile;
    wherein the data profile classification machine learning model comprises a plurality of classification parameters trained to identify similar entities based at least in part on data profile-related data entries;
    wherein the data profile-related data entries represent data profile-related electronic activities and data profile-related electronic activity reversals;
  determining, by the at least one processor, a reversal rate of data entries in the history of data entries for the particular data profile;
  determining, by the at least one processor, an electronic activity reversal ranking of the data entries in the history of data entries for the particular data profile based at least in part on the reversal rate and the data profile classification type;
  determining, by the at least one processor, an electronic activity reversal restriction where the electronic activity reversal ranking is below a predetermined value; and
  generating, by the at least one processor, a computer instruction to the computing device to cause a pop-up notification comprising the electronic activity reversal restriction of the particular data profile to be presented to the user.

Clause 2. A system comprising:
  at least one processor configured to execute computer instructions that cause the at least one processor to perform steps to:
    receive location data from a computing device associated with a user, wherein the physical location data represents a physical location of the computing device;
    utilize a data profile classification machine learning model to classify a particular data profile according to a data profile classification type based at least in part on a history of data entries associated with the particular data profile when the physical location is within a predetermined proximity of another physical location associated with the particular data profile;
      wherein the data profile classification machine learning model comprises a plurality of classification parameters trained to identify similar entities based at least in part on data profile-related data entries;
      wherein the data profile-related data entries represent data profile-related electronic activities and data profile-related electronic activity reversals;
    determine a reversal rate of data entries in the history of data entries for the particular data profile;
    determine an electronic activity reversal ranking of the data entries in the history of data entries for the particular data profile based at least in part on the reversal rate and the data profile classification type;
    determine an electronic activity reversal restriction where the electronic activity reversal ranking is below a predetermined value; and
    generate a computer instruction to the computing device to cause a pop-up notification comprising the electronic activity reversal restriction of the particular data profile to be presented to the user.

Clause 3. A method comprising:
  receiving, by at least one processor, web browsing data from a computing device associated with a user, wherein the web browsing data represents a website visited by the computing device;
  utilizing, by the at least one processor, a data profile classification machine learning model to classify the particular data profile according to a data profile classification type based at least in part on a history of data entries associated with the particular data profile when the web browsing data represents the website matching a data profile website associated with a particular data profile;

wherein the data profile classification machine learning model comprises a plurality of classification parameters trained to identify similar entities based at least in part on data profile-related data entries;

wherein the data profile-related data entries represent data profile-related electronic activities and data profile-related electronic activity reversals;

determining, by the at least one processor, a reversal rate of data entries in the history of data entries for the particular data profile;

determining, by the at least one processor, an electronic activity reversal ranking of the data entries in the history of data entries for the particular data profile based at least in part on the reversal rate and the data profile classification type;

determining, by the at least one processor, an electronic activity reversal restriction where the electronic activity reversal ranking is below a predetermined value; and generating, by the at least one processor, a computer instruction to the computing device to cause a pop-up notification comprising the electronic activity reversal restriction of the particular data profile.

Clause 4. The methods and systems of clauses 1, 2 and/or 3, further comprising:

accessing, by the at least one processor, the data profile-related data entries of each data profile in a set of entities;

extracting, by the at least one processor, electronic activity features from each data profile-related data entry;

determining, by the at least one processor, a set of reversal data entries representing reversed electronic activities based at least in part on the electronic activity features from each data profile related data entry; and training, by the at least one processor, the classification parameters of the data profile classification machine learning model to correlate the electronic activity features of a subset of the entities in the set of the entities to electronic activity reversal opportunities based at least in part on the set of reversal data entries.

Clause 5. The methods and systems of clauses 1, 2 and/or 3, further comprising:

accessing, by the at least one processor, the data profile-related data entries of each data profile in a set of entities;

accessing, by the at least one processor, dispute data entries representing disputed data profile-related data entries of the data profile-related data entries;

extracting, by the at least one processor, electronic activity features from each data profile-related data entry;

determining, by the at least one processor, a set of reversal data entries representing reversed electronic activities based at least in part on the electronic activity features from each data profile related data entry; and training, by the at least one processor, the classification parameters of the data profile classification machine learning model to correlate the electronic activity features and the dispute data entries of a subset of the entities in the set of the entities to electronic activity reversal opportunities based at least in part on the set of reversal data entries.

Clause 6. The methods and systems of clauses 1, 2 and/or 3, wherein the particular data profile comprises a merchant and the data profile-related data entries comprise transaction records.

Clause 7. The methods and systems of clause 6, wherein data profile-related electronic activities comprise transactions associated with the transaction records and data profile-related electronic activity reversals comprise refunds for one or more transactions of the data profile-related electronic activities.

Clause 8. The methods and systems of clauses 1, 2 and/or 3, wherein the data profile classification machine learning model comprises a clustering model.

Clause 9. The methods and systems of clauses 1, 2 and/or 3, further comprising:

receiving, by the at least one processor, user feedback data representing user feedback indicating the electronic activity reversal restriction; and training, by the at least one processor, the classification parameters of the data profile classification machine learning model based at least in part on the data profile classification type and the user feedback data.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:

accessing, by at least one processor, data profile-related data entries of each data profile in a set of entities;

extracting, by the at least one processor, electronic activity features from each data profile-related data entry;

determining, by the at least one processor, a similarity metric between each data profile-related data entry and at least one later data profile-related data entry in the data profile-related data entries;

wherein the similarity metric comprises at least one measure of similarity between the electronic activity features of each data profile-related data entry and the at least one later data profile-related data entry in the data profile-related data entries;

wherein the at least one later data profile-related data entry is later in time relative to each data profile-related data entry;

determining, by the at least one processor, at least one reversal data entry of the at least one later data profile-related data entry based at least in part on the electronic activity features of the at least one reversal data entry indicating an opposite electronic activity to at least one corresponding data profile-related data entry;

re-training, by the at least one processor, a plurality of classification parameters of a data profile classification machine learning model to increase a correlation of the electronic activity features of a plurality of data profiles to electronic activity reversal opportunities based at least in part on the electronic activity features of the at least one reversal data entry, as to generate a retrained data profile classification machine learning model; and deploying, by the at least one processor, the retrained data profile classification machine learning model so as to enable automatic identification of data profiles as having the electronic activity reversal opportunities.

2. The method of claim 1, further comprising:

accessing, by the at least one processor, the data profile-related data entries of each data profile in the set of entities;

extracting, by the at least one processor, the electronic activity features from each data profile-related data entry;

determining, by the at least one processor, a set of reversal data entries representing reversed electronic activities based at least in part on the electronic activity features from each data profile related data entry; and training, by the at least one processor, the plurality of classification parameters of the data profile classification machine learning model to correlate the electronic activity features of a plurality of data profiles to electronic activity reversal opportunities based at least in part on the set of reversal data entries.

3. The method of claim 1, further comprising:

accessing, by the at least one processor, the data profile-related data entries of each data profile in the set of entities;

accessing, by the at least one processor, dispute data entries representing disputed data profile-related data entries of the data profile-related data entries;

extracting, by the at least one processor, the electronic activity features from each data profile-related data entry;

determining, by the at least one processor, a set of reversal data entries representing reversed electronic activities based at least in part on the electronic activity features from each data profile related data entry; and training, by the at least one processor, the plurality of classification parameters of the data profile classification machine learning model to correlate the electronic activity features and the dispute data entries of a plurality of data profiles to electronic activity reversal opportunities based at least in part on the set of reversal data entries.

4. The method of claim 1, wherein each data profile comprises a merchant and the data profile-related data entries comprise transaction records.

5. The method of claim 4, wherein data profile-related electronic activities comprise transactions associated with the transaction records and data profile-related electronic activity reversals comprise refunds for one or more transactions of the data profile-related electronic activities.

6. The method of claim 1, wherein the data profile classification machine learning model comprises a clustering model.

7. The method of claim 1, further comprising:

receiving, by the at least one processor, user feedback data representing user feedback indicating the electronic activity reversal opportunities; and training, by the at least one processor, the plurality of classification parameters of the data profile classification machine learning model based at least in part on a data profile classification type and the user feedback data.

8. A system comprising:

at least one processor configured to execute computer instructions that cause the at least one processor to perform steps to:

access data profile-related data entries of each data profile in a set of entities;

extract electronic activity features from each data profile-related data entry;

determine a similarity metric between each data profile-related data entry and at least one later data profile-related data entry in the data profile-related data entries;

wherein the similarity metric comprises at least one measure of similarity between the electronic activity features of each data profile-related data entry and the at least one later data profile-related data entry in the data profile-related data entries;

wherein the at least one later data profile-related data entry is later in time relative to each data profile-related data entry;

determine at least one reversal data entry of the at least one later data profile-related data entry based at least in part on the electronic activity features of the at least one reversal data entry indicating an opposite electronic activity to at least one corresponding data profile-related data entry;

re-train a plurality of classification parameters of a data profile classification machine learning model to increase a correlation of the electronic activity features of a plurality of data profiles to electronic activity reversal opportunities based at least in part on the electronic activity features of the at least one reversal data entry, as to generate a retrained data profile classification machine learning model; and deploy the retrained data profile classification machine learning model so as to enable automatic identification of data profiles as having the electronic activity reversal opportunities.

9. The system of claim 8, wherein the at least one processor is further configured to execute computer instructions that cause the at least one processor to perform further steps to:

access the data profile-related data entries of each data profile in the set of entities;

extract the electronic activity features from each data profile-related data entry;

determine a set of reversal data entries representing reversed electronic activities based at least in part on the electronic activity features from each data profile related data entry; and train the plurality of classification parameters of the data profile classification machine learning model to correlate the electronic activity features of a plurality of data profiles to electronic activity reversal opportunities based at least in part on the set of reversal data entries.

10. The system of claim 8, wherein the at least one processor is further configured to execute computer instructions that cause the at least one processor to perform further steps to:

access the data profile-related data entries of each data profile in the set of entities;

access dispute data entries representing disputed data profile-related data entries of the data profile-related data entries;

extract the electronic activity features from each data profile-related data entry;

determine a set of reversal data entries representing reversed electronic activities based at least in part on the electronic activity features from each data profile related data entry; and train the plurality of classification parameters of the data profile classification machine learning model to correlate the electronic activity features and the dispute data entries of a plurality of data profiles to electronic activity reversal opportunities based at least in part on the set of reversal data entries.

11. The system of claim 8, wherein each data profile comprises a merchant and the data profile-related data entries comprise transaction records.

12. The system of claim 8, wherein the data profile classification machine learning model comprises a clustering model.

13. The system of claim 8, wherein the at least one processor is further configured to execute computer instructions that cause the at least one processor to perform further steps to:

receive user feedback data representing user feedback indicating the electronic activity reversal opportunities; and train the plurality of classification parameters of the data profile classification machine learning model based at least in part on a data profile classification type and the user feedback data.

* * * * *